(12) United States Patent
Wixom et al.

(10) Patent No.: US 12,347,861 B2
(45) Date of Patent: Jul. 1, 2025

(54) COMPOSITIONS AND METHODS FOR ELECTRODE FABRICATION

(71) Applicant: Navitas Systems, LLC, Woodridge, IL (US)

(72) Inventors: Michael Wixom, Ann Arbor, MI (US); Bob Sosik, Ann Arbor, MI (US); Pu Zhang, Ann Arbor, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 313 days.

(21) Appl. No.: 16/300,701

(22) PCT Filed: May 12, 2017

(86) PCT No.: PCT/US2017/032465
§ 371 (c)(1),
(2) Date: Nov. 12, 2018

(87) PCT Pub. No.: WO2017/197299
PCT Pub. Date: Nov. 16, 2017

(65) Prior Publication Data
US 2020/0313191 A1    Oct. 1, 2020

Related U.S. Application Data

(60) Provisional application No. 62/335,257, filed on May 12, 2016.

(51) Int. Cl.
   *H01M 4/62*    (2006.01)
   *H01M 4/04*    (2006.01)
   *H01M 4/139*   (2010.01)
(52) U.S. Cl.
   CPC .......... *H01M 4/621* (2013.01); *H01M 4/043* (2013.01); *H01M 4/139* (2013.01)

(58) Field of Classification Search
   CPC ...... H01M 4/043; H01M 4/139; H01M 4/621; H01M 4/62
   See application file for complete search history.

(56) References Cited

U.S. PATENT DOCUMENTS

2005/0064289 A1*  3/2005  Suzuki ............... H01M 4/0416
                                                    429/209
2005/0227146 A1* 10/2005  Ghantous ............ H01M 4/381
                                                    423/489

(Continued)

FOREIGN PATENT DOCUMENTS

EP    3293745 A1    3/2018
KR   20040077212 A  *  9/2004

(Continued)

OTHER PUBLICATIONS

US-20180097223-A1 listed above is English Translation of WIPO document WO-2016163115-A1 Both are included here for ease of access (Year: 2016).*

(Continued)

*Primary Examiner* — Matthew T Martin
*Assistant Examiner* — Adam J Francis
(74) *Attorney, Agent, or Firm* — Weston R. Gould; Dinsmore & Shohl LLP (57) ABSTRACT

Provided are compositions and methods of malting and using free-standing electrode films for electrodes by a dry process. The process for forming an electrode includes combining a processing additive and an active electrode material or fibrillizable binder to form an electrode precursor material, where the processing additive has a surface roughness and a porosity and intermixing the electrode precursor material. The electrode precursor material may then be combined with the fibrillizable binder or the active electrode material and the fibrillizable binder or the active electrode material is intermixed with the electrode precursor material (Continued)

to form an electrode film material. The electrode film material includes the processing additive, the fibrillizable binder and the active electrode material. The electrode film material is then compressed into an electrode film.

15 Claims, 3 Drawing Sheets

(56) References Cited

U.S. PATENT DOCUMENTS

| | | | | |
|---|---|---|---|---|
| 2007/0081299 | A1* | 4/2007 | Zhong | H01G 9/02 361/502 |
| 2008/0014139 | A1 | 1/2008 | Zhong et al. | |
| 2012/0301387 | A1 | 11/2012 | Neumann | |
| 2012/0315550 | A1* | 12/2012 | Liu | H01M 10/052 429/338 |
| 2013/0157141 | A1* | 6/2013 | Zhong | H01M 4/622 252/502 |
| 2015/0061176 | A1* | 3/2015 | Bruckner | H01M 4/0411 264/105 |
| 2015/0303481 | A1* | 10/2015 | Duong | H01M 10/0525 241/5 |
| 2015/0318539 | A1 | 11/2015 | Kelley et al. | |
| 2015/0321187 | A1* | 11/2015 | Dias | C07C 51/235 562/531 |
| 2016/0111225 | A1 | 4/2016 | Hippchen et al. | |
| 2016/0111726 | A1* | 4/2016 | Neumann | H01M 4/0435 429/232 |
| 2018/0097223 | A1* | 4/2018 | Saito | H01M 4/386 |

FOREIGN PATENT DOCUMENTS

| | | | | |
|---|---|---|---|---|
| WO | | 2016-040461 A1 | 3/2016 | |
| WO | WO-2016163115 A1 | * | 10/2016 | H01M 4/587 |

OTHER PUBLICATIONS

International Carbon Black Associate; Particle properties of Carbon Black, https://www.carbon-black.org/s/ICBA-Particle-CB-Factsheet-111413-82dh.pdf; first indexed roughly 10 years ago (Year: 2022).*

European Supplementary Search Report and Search Opinion for European Application No. 17796958.1 for Navitas Systems LLC on Nov. 19, 2019.

"Porocarb could improve lithium-ion battery performance", Power Electronics World, Sep. 29, 2013 (https://powerelectronicsworld.net/article/78394/Porocard_could_improve_lithium-ion_battery_performance).

Kim, Ick-Jun et al., "Development of carbon-PTFE electrode for electric double layer capacitor", 2004 Joing International Meeting, 650.

* cited by examiner

COMPOSITIONS AND METHODS FOR ELECTRODE FABRICATION

CROSS-REFERENCE TO RELATED APPLICATION

This application claims priority of U.S. Patent Application Ser. No. 62/335,257 filed May 12, 2016, the disclosure of which is incorporated herein by reference.

STATEMENT OF GOVERNMENT RIGHTS

This disclosure was created with Government support under Contract No. DE-EE0005385 awarded by the U.S. Department of Energy. The Government has certain rights in this invention.

FIELD

The disclosure relates to batteries and methods for forming electrodes with excellent mechanical properties. More specifically, the disclosure relates to methods for forming thin electrodes suitable for use in lithium ion batteries.

BACKGROUND

Rechargeable lithium-ion batteries are increasingly used in essential applications such as powering electric/hybrid vehicles, cellular telephones, and cameras. Recharging these battery systems is achieved using electrical energy to reverse the chemical reaction between and at the electrodes used to power the device during battery discharge thereby priming the battery to be capable of delivering additional electrical power.

Typical electrode manufacturing techniques for use in an electrochemical cell include the formation of an active electrode material that is then coated or extruded onto a conductive substrate. The active electrode material is mixed with a binder that serves to associate the active materials. These binders are commonly polymers or resins. To assist in formation of a proper binder, formulations use additives such as solvents, plasticizers, or liquids to dissolve the binder material to form a wet slurry that can effectively be coated onto a conductive substrate. It is beneficial to fibrillate the binder material before or during combination with active material to improve the adhesive properties of the binder. Additives such as activated carbon may be introduced with the binder material in an extruder or other apparatus that serves to fibrillate the binder. When fibrillated, the binder material has improved support for the active material.

In a conventional battery, the polymer binder is dissolved in the solvent and coats the surrounding active particles. When solvent is removed the polymers become sticky and provide the adhesion to a substrate or cohesion between particles. During this process, the solvent remains intermixed with the binder material as a wet slurry. Following extrusion or coating, the wet slurry is then dried to remove the solvent as the continued presence of such additives is commonly detrimental to cell performance. Unfortunately, the drying process is difficult to fully achieve under the short timeframes of common manufacturing conditions thereby requiring fast dry times. This may result in residual additive and impurities remaining in the electrode.

Dry binder formulations have been attempted to reduce or eliminate the drying step by incorporating an additive into the binder that when subjected to high shear mixing serves to fibrillate the binder. The fibrillated binder creates a web-like structure that holds the materials together. Activated carbon (AC) is the typical additive used to promote binder fibrillation. Activated carbon is derived from pyrolyzing and 'activating' a highly cross-linked cellulosic polymer precursor. The cross-linking provides a high degree of mechanical strength, which is desired during high shear mixing. The active carbon particle mechanical properties are more isotropic than many graphitic carbon materials. Activation also results in a high degree of nanoporosity and the creation of hydrophilic surface functional groups, which tightly bond water. For commercial applications, AC powders are typically milled to tens of μm particle dimensions prior to activation.

While AC solves some issues with electrode formation by eliminating the solvent additive to the binder and greatly reducing any subsequently required drying time, AC has other disadvantages when dry formation processes are used to make electrodes used for lithium-ion cells. Activated carbon adds parasitic mass and cost to the electrode without contributing to energy storage. In addition, the activated carbon particles are significantly larger in diameter than the active electrode powders used in lithium ion cells. This creates a lower limit on film thickness of several times the AC particle diameter. It is difficult to attain uniform dispersion of particles with substantial variation of diameter and mass density. The presence of the large AC particles in the electrodes appears to nucleate cracks and mechanical failure in the electrodes as the electrode material flows while passing through the roll mill to reduce thickness.

As such, new materials and methods are needed to improve mechanical properties and processibility of materials used in electrodes of rechargeable batteries.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

It is an object of this disclosure to provide processes for forming an electrode or active layer thereof. It was found that certain processing additives can be substituted for active carbon (AC) in whole or in part and improve electrode formation by dry processes. The processes for forming an electrode include combining such a processing additive and an active electrode material or fibrillizable binder to form an electrode precursor material, where the processing additive has a surface roughness and a porosity, and intermixing the electrode precursor material. The process further includes combining the electrode precursor material with the fibrillizable binder or the active electrode material and intermixing the fibrillizable binder or the active electrode material with the electrode precursor material to form an electrode film material where the electrode film material includes the processing additive, the fibrillizable binder and the active electrode material. In some aspects, the process further includes compressing the electrode film material into an electrode film.

In some aspects the processing additive includes a pore diameter of about 10 nanometers to about 1000 nanometers or a cumulative pore volume of about 0.8 to about 2.5 mL/g. Optionally, the fibrillizable binder is or includes polytetrafluoroethylene (PTFE) and the active electrode material is or includes a nickel oxide such as a nickel, manganese, cobalt (NMC) oxide material. The process further includes compressing the electrode film material into an electrode film.

In some aspects of the disclosure, the process includes combining and intermixing the processing additive and the active electrode material to form the electrode precursor material and combining and intermixing the electrode precursor material and the fibrillizable binder to form the electrode film material.

In other aspects of the disclosure, the process includes combining and intermixing the processing additive and the fibrillizable binder to form the electrode precursor material and combining and intermixing the electrode precursor material and the active electrode material to form the electrode film material.

In some aspects, the process further includes laminating the electrode film to an electrode substrate to form the electrode.

In some aspects, the electrode film material includes a conductive carbon.

In some aspects, intermixing is in the absence of a solvent greater than 1%.

In some aspects, the electrode film material is absent activated carbon.

In some aspects, the processing additive is absent activated carbon.

In some aspects, the processing additive has an average diameter of 1 to 50 μm.

In some aspects, the processing additive has an average diameter of 1 to 20 μm.

In some aspects, the surface of the processing additive includes a high-porosity surface structure defined by a pore diameter of about 10 nanometers to about 1000 nanometers, a cumulative pore volume of about 0.8 to about 2.5 mL/g, or both.

In some aspects, the surface of the processing additive includes a high-porosity surface structure defined by a pore diameter of about 10 nanometers to about 1000 nanometers, a density of about 1500 to about 2500 kg/m$^3$, or both.

In some aspects, the electrode film includes a thickness of 100 micrometers or less.

In some aspects, the electrode film includes a thickness of 50 micrometers or less.

In some aspects, the active electrode material is capable of absorbing and desorbing lithium.

In some aspects, the process further includes sieving the electrode film material.

In some aspects, the active electrode material includes lithium iron phosphate or graphite.

In some aspects, the processing additive includes a graphitized particle.

In some aspects, the processing additive is present at a concentration of 40 to 70 percent relative to the fibrillizable binder.

In some aspects, the fibrillizable binder includes polytetrafluoroethylene.

In some aspects, the electrode film material includes a single fibrillizable binder, where the fibrillizable binder is polytetrafluoroethylene.

In some aspects, processing additive includes a pyrolized material.

In some aspects, the porosity of the processing additive is from about 35% to about 40%.

In some aspects, an electrochemical cell includes a cathode including the electrode film.

In some aspects, an electrochemical cell includes an anode including the electrode film.

BRIEF DESCRIPTION OF THE DRAWINGS

The aspects of the disclosure set forth in the drawings are illustrative and exemplary in nature and not intended to limit the subject matter defined by the claims. The following detailed description of the illustrative aspects of the disclosure can be understood when read in conjunction with the following drawings, where like structure is indicated with like reference numerals and in which:

DETAILED DESCRIPTION

The following description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the disclosure may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first 'element'", "component," "region," "layer," or "section" discussed below could be termed a second (or other) element, component, region, layer, or section without departing from the teachings herein.

The terminology used herein is for the purpose of describing particular aspects of the disclosure only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "absorbing" can mean: intercalation or insertion or conversion alloying reactions of lithium with the active materials.

As used herein, "desorbing" can mean: de-intercalation or de-insertion or conversion de-alloying reactions of lithium with the active materials.

As used herein, in the context of the Li-ion cell, "cathode" means positive electrode and "anode" means the negative electrode.

As used herein an "active material" is a material that participates in electrochemical charge/discharge reaction of an electrochemical cell such as by absorbing or desorbing lithium.

As used herein, "fibrillizable" can mean capable of processing into the formation of fibrils.

As used herein, "intermixing" can mean forming a mixture by mixing a mass of ingredients. Intermixing can mean high-shear mixing to effect fibrillization.

As used herein, "mechanical strength" can mean the ability of a material to withstand an applied load without failure or deformation.

As used herein, "surface roughness" can mean the roughness or a surface texture defined by deviations in the normal vector of a real surface from its ideal form. Surface roughness may include complex shapes made of a series of peaks and troughs/pores of varying heights, depths, and spacing.

Formation of electrodes for lithium-ion cells typically involves creating active material layers with a thickness for cathodes of ~100 μm and anodes of ~50 μm. It was initially thought that the use of activated carbon (AC) as an additive similar to that used in U.S. Pat. No. 8,072,374 for ultracapacitors would also be suitable for formation of electrodes used in lithium ion batteries. Ultracapacitor electrodes require electrode porosity and wetting comparable to lithium ion batteries, but since they do not need to support ion transport through the bulk electrolyte, the electrodes can be fabricated with greater thickness. Initial studies demonstrated that using AC as an additive in electrochemical cell electrodes proved difficult resulting in poor mechanical properties even with relatively high binder mass fractions and aggressive mixing. In addition, it was found that the activated carbon particles introduce extensive nanoporosity into the electrode. The nanoporosity contributes to irreversible loss of lithium, particularly if used in the anode where formation of the SEI layer consumes lithium. The AC pore volume parasitically consumes liquid electrolyte. The nanostructure of the AC pores can require extensive wetting time, slowing down production or leading to drying and capacity loss or failure of the cell.

In addition, the AC nanoporosity and surface chemistry are highly hydrophilic. Residual water content is detrimental to lithium ion battery performance. Electrodes and stacks are typically vacuum dried prior to cell assembly and electrolyte fill. Whereas overnight drying at 70° C. under vacuum is typical drying condition for a production electrode, up to 6 days was required to dry electrodes containing AC to attain a comparable residual water content specification. In the course of attempting to improve electrode processibility and mechanical properties, numerous variations in formulation and processing conditions were investigated. The results of this investigation showed that blending active material such as $LiFePO_4$ (LFP) with oxides and with AC improved processibility. Although the mechanism is uncertain, the activated carbon was believed to provide 'hooks' or 'anchors' for the PTFE binder fibers which helped promote adhesion of the electrode particles. The activated carbon was typically used in 5-20% mass fraction and had a particle size in 40 μm range with BET surface area>1000 $m^2/g$, optionally >800 $m^2/g$. Unlike, conductive carbon that typically is a paracrystalline carbon with a moderate surface area<200 $m^2/g$.

The inventors of this disclosure discovered that adding an engineered porosity carbon material as a processing additive along with activated carbon or in place of activated carbon with a fibrillizable binder material in a dry process manufacturing method unexpectedly improved the processing characteristics and electrochemical and mechanical properties of resulting electrodes. It is appreciated that a processing additive is not activated carbon. A processing additive optionally has a surface roughness on a dimensional scale that is within 10% to 250% of that found in PTFE fibers. Such a surface is rough on a dimensional scale where roughness is defined as a plurality of hills and valleys on the surface of the processing additive. In some aspects of the disclosure, a surface roughness defines a porous surface structure, optionally a surface structure having high porosity. High-porosity is defined as a pore diameter of about 10 nm to about 1000 nm having a cumulative pore volume of about 0.8 mL/g to about 2.5 mL/g, or having a porous structure with a density of about 1500 $kg/m^3$ to about 2500 $kg/m^3$. Optionally, the cumulative pore volume is about 1.0 mL/g to about 2.5 mL/g, optionally about 1.2 mL/g to about 2.2 mL/g, optionally with a pore diameter of about 10 nm to about 1000 nm. In some aspects, the processing additive has a cumulative pore volume of optionally of or greater than 0.8 mL/g, optionally about 0.9 mL/g, 1.0 mL/g, 1.1 mL/g, 1.2 mL/g, 1.3 mL/g, 1.4 mL/g, 1.5 mL/g, 1.6 mL/g, 1.7 mL/g, optionally 1.8 mL/g, 1.9 mL/g, 2.0 mL/g, 2.1 mL/g, 2.2 mL/g, 2.3 mL/g, 2.4 mL/g, 2.5 mL/g. For comparison, activated carbon has a pore volume of about 0.9 mL/g. The processing additive for example, without limitation, may have a porosity of about 30 vol % to about 40 vol %, or any value or range therebetween, optionally about 35 vol % to about 40 vol %, optionally about 30 vol %, 31 vol %, 32 vol %, 33 vol %, 34 vol %, 35 vol %, 36 vol %, 37 vol %, 38 vol %, 39 vol %, 40 vol %.

In some aspects of the disclosure, the processing additive is capable of maintaining porosity during calendering. For example, porosity of the processing additive decreases by less than half of the porosity before calendering. A processing additive is appreciated not to be activated carbon, but will have a mechanical strength sufficient to survive high energy mixing typically used in the art to fibrillize a binder.

As used herein, sufficient mechanical strength may be defined as the ability of the additive not to break apart during intermixing and produce fines. These rough and/or porous processing additives significantly improved overall processibility and mechanical strength when electrode materials are formed using a low or non-solvent process such as that described in U.S. Pat. No. 8,072,734.

Examples of a processing additive as used herein include a silica-templated high-porosity optionally graphitized carbon material with particle size distribution optionally peaking in about the 3 micrometer (μm) to about 5 μm range. In some aspects, the BET area of the material is much less than conventional AC and the material is not activated and thus is less hydrophilic than AC. The graphitization process imparts mechanical strength comparable to the pyrolyzed highly-cross linked cellulosic precursor sources used to form AC. An illustrative example of a processing additive such as porous carbon is sold as POROCARB by Heraeus Quarzglas GmbH & Co. KG, Kleinostheim, Germany.

A manufacturing method for exemplary porous carbon particles for use as a processing additive herein may be found in German published patent application DE 10 2010 005 954 A1 and U.S. Pat. No. 9,174,878. In general, a porous metal oxide template of agglomerated or aggregated metal oxide nanoparticles is first produced by hydrolysis or pyrolysis of a starting compound by means of a soot deposition process. The pores are infiltrated with a carbon precursor substance. After carbonization, the template is again removed by etching. What remains is a porous carbon product having a hierarchical pore structure with platelet-like or flake-like morphology.

In some aspects of the disclosure, a processing additive is a hard carbon with mechanical properties similar to activated carbon with regard to properties such as particle strength, particle morphology, or surface roughness, which may contribute to the electrode processibility, but with lower porosity, lower surface area (e.g., as measured by gas adsorption), or less hydroscopic than activated carbon. An illustrative example of a hard carbon is sold as LBV-1 Hard Carbon from Sumitomo Bakelite Co., LTD. Such a material may be obtained from pyrolizing highly cross-linked cellulosic precursors. Whereas commercial 'activated carbon' materials are subjected to a pore-forming activation process prior to particle size reduction and classification, the desired exemplary processing additive may be formed by excluding the activation process. The exemplary processing additive optionally has a BET surface area<200 $m^2/g$ and preferably <20 $m^2/g$, compared to areas>800 $m^2/g$ for commercial activated carbon.

A processing additive has a particle diameter. It is preferred that particle diameters of 50 μm or less are used. Optionally, a processing additive has an average particle diameter of 1 μm to 50 μm, optionally 1 μm to 30 μm, optionally 1 μm to 25 μm, optionally 1 μm to 20 μm, optionally 1 μm to 5 μm, optionally 3 μm to 10 μm.

A processing additive is optionally present at a concentration of 20 weight to 75 weight percent the amount of binder used to form an electrode. Optionally, the processing additive is present at a weight percent of 30 percent to 60 percent, optionally, 40 percent to 70 percent, optionally 50 percent to 70 percent, the amount of binder. In some aspects of the disclosure, the processing additive is used to the exclusion of activated carbon. Optionally, the processing additive is used in place of some amount of activated carbon, but the processing additive and the activated carbon are used together.

A processing additive is optionally present at a concentration relative to an overall electrode material. An overall weight percent concentration of processing additive is optionally from 2 percent to 10 percent, optionally from 2 percent to 6 percent, optionally from 4 percent to 8 percent, optionally at 5 percent. In some aspects of the disclosure, the overall concentration of processing additive is optionally greater than or equal to 5 weight percent, optionally 5 weigh percent to 8 weight percent to greater, optionally when blended with an active material such as LFP, NMC, LmFP, or the like.

In some aspects, an electrode includes a conductive carbon. It is appreciated that activated carbon and conductive carbon are each conductive to relative degrees. Generally, for electrochemical purposes however, conductive carbons are small (<1 μm) materials that disperse readily and/or may dry coat the electrode materials to provide electronic linkages through the electrode. (e.g., electron transport via percolation model). As such, conductive carbon as used herein is not activated carbon (AC) as is otherwise described herein. The dispersed conductive carbon network may be described in some cases as "chain of pearls." In other cases conductive carbons may be high aspect ratio fibers or platelets that can wrap powders and/or form a web type network. In some aspects, electrodes may use combinations of conductive carbons. On the other hand, activated carbon generally refers to very high surface area microporous materials. Conductive carbons may or may not be porous but in many cases are also high surface area but with more of the surface area due to exterior of small particles rather than internal pore volume as is the case for activated carbons. Commercial activated carbons are generally much larger particles than conductive carbons.

The results of the studies are low- and zero-solvent electrode coating formulations that can be used with many electrochemically active materials. Active electrode materials optionally include Nickel Manganese Cobalt (NMC622, NMC811, NMC532) (a.k.a. NCM or NMC), Lithium Manganese Spinel (LMO), Lithium Nickel Manganese Spinel (LNMO), Lithium Nickel Cobalt Aluminum Oxide (NCA), Lithium Iron Phosphate (LFP), Lithium Iron Manganese Phosphate (LmFP), Lithium Cobalt Oxide (LCO), and graphite formulas, or combinations thereof. In particular examples, an electrochemically active material is one or more NCM materials, optionally at the exclusion of one or more other materials.

Binders such as polytetrafluoroethylene (PTFE) or polyvinylidene fluoride (PVdF) powders may be blended into active materials and fibrillized under high-shear mixing. After fibrillization, the electrode materials can be processed into a free-standing film by feeding into a roll mill. The free-standing films are then laminated to metal foil current collectors, perhaps following additional passes through the roll mill to attain the desired electrode film thickness and porosity. An electrode film thickness may be from about 40 μm to about 400 μm, optionally about 50 μm to about 100 μm, optionally about 100 μm or less, optionally about 50 μm or less. As such, the disclosure has utility as a processing additive to improve binder fibrillization and resulting electrode mechanical properties. A further purpose of this disclosure is to enable lithium ion battery fabrication using dry electrode processing and PTFE binders.

A binder material optionally includes a fibrillizable fluoropolymer, optionally, polytetrafluoroethylene (PTFE). Other possible fibrillizable binders include ultra-high molecular weight polypropylene, polyethylene, co-polymers, polymer blends and the like. Optionally, a binder material is a combination of any of the foregoing.

The inventors discovered that mere combining of a processing additive with an active material and a binder resulted in poor dry process material. As such, it was discovered that dispersing the processing additive in the active electrode material or the fibrillizable binder and subsequently intermixing the previously omitted active electrode material or the fibrillizable binder improved the processing characteristics and electrochemical properties of the resulting electrodes. As such, the combination of elements of a resulting film required particular order and dispersion properties whereby intermixing of the processing additive with the entire set of materials was non-optimal. Great improvements in processibility of the electrode material is achieved by first intermixing the processing additive with either the binder or the active material prior to combination with the other.

Prior to forming the free-standing film and laminating the free-standing film to a substrate such as a metal foil current collector thereby forming an electrode, an electrode precursor material is formed. The metal foil current collector may be an aluminum foil, a copper foil or optionally another conductive metal foil. The electrode precursor material is appreciated to be a free flowing powder. The electrode precursor materials herein preferably contain no more water or other liquid solvent than the ambient atmosphere, preferably less than 1% of any liquid including for example solvents, water, ethanol, or the like. The improved processibility of the materials formed using the processing additive and by methods as described herein is further enhanced by the dry aspects of the materials that provide more rapid overall electrode manufacture.

In some aspects of the disclosure, forming the free flowing powder includes combining an active electrode material and processing additive. The active material optionally comprises 100% NMC, 80% NMC, 60% NMC, 50% NMC, 40% NMC, and 20% NMC. Optionally, the active material blended with the NMC is LmFP. The processing additive optionally comprises a porous carbon additive sold as POROCARB. The processing addictive may be dispersed with the active electrode material by intermixing. Intermixing may occur from about 5,000 RPM to about 500 RPM for 1 minute, optionally from about 2,000 RPM to about 4,000 RPM for 1 minute, optionally at about 3,000 RPM for 1 minute. The intermixing may include a cool down for 5 minutes at about −20 degrees Celsius to about 10 degrees Celsius, optionally at −20 degrees Celsius, −10 degrees Celsius, 0 degrees Celsius, or 10 degree Celsius. The intermixing and cool down may be repeated 1, 2, or 3 times to disperse the processing additive in the active electrode material. In some aspects, the intermixing and cool down may be repeated until the a tap density is measured from about 0.99 g/cm$^3$ to about 1.1 g/cm$^3$. A fibrillizable binder may then be added to the processing additive and active electrode material mixture. The fibrillizable binder is intermixed from about 25,000 RPM to about 10,000 RPM, optionally at about 18,000 RPM for 30 seconds followed by a cool down for 10 minutes at about −20 degrees Celsius to about 10 degrees Celsius, optionally at −20 degrees Celsius, −10 degrees Celsius, 0 degrees Celsius, or 10 degree Celsius. In some aspects, the fibrillizable binder is intermixed from about 2,000 RPM to about 4,000 RPM, optionally at about 3,000 RPM for 1 minute followed by a cool down for 10 minutes at about −20 degrees Celsius to about 10 degrees Celsius, optionally at −20 degrees Celsius, −10 degrees Celsius, 0 degrees Celsius, or 10 degree Celsius. The high shear mixing serves to fibrillate the binder. The intermixing and subsequent cool down of the fibrillizable binder with the processing additive and active electrode material mixture may be repeated 1, 3, 4, 5 or 6 times to form an electrode precursor material in a free flowing powder form. In some aspects, the intermixing and cool down may be repeated until the a tap density is measured from about 0.73 g/cm$^3$ to about 0.81 g/cm$^3$.

In other aspects of the disclosure, forming the free flowing powder includes combining a fibrillizable binder and processing additive. The processing addictive may be dispersed with the fibrillizable binder by intermixing. The fibrillizable binder may be intermixed from about 25,000 RPM to about 10,000 RPM, optionally at about 18,000 RPM for 30 seconds followed by a cool down for 10 minutes at about −20 degrees Celsius to about 10 degrees Celsius, optionally at −20 degrees Celsius, −10 degrees Celsius, 0 degrees Celsius, or 10 degree Celsius. In some aspects, the fibrillizable binder is intermixed from about 2,000 RPM to about 4,000 RPM, optionally at about 3,000 RPM for 1 minute followed by a cool down for 10 minutes at about −20 degrees Celsius to about 10 degrees Celsius, optionally at −20 degrees Celsius, −10 degrees Celsius, 0 degrees Celsius, or 10 degree Celsius. The high shear mixing serves to fibrillate the binder. The intermixing and subsequent cool down of the fibrillizable binder with the processing additive may be repeated 1, 2, 3, 4, 5 or 6 times to fibrillize the binder and disperse the processing additive with the fibrillizable binder. In some aspects, the intermixing and cool down may be repeated until the a tap density is measured from about 0.73 g/cm$^3$ to about 0.81 g/cm$^3$. An active electrode material may then be added to the processing additive and fibrillizable binder and intermixed. Intermixing may occur from about 5,000 RPM to about 500 RPM for 1 minute, optionally from about 2,000 RPM to about 4,000 RPM for 1 minute, optionally at about 3,000 RPM for 1 minute The intermixing may be followed by a cool down for 5 minutes at about −20 degrees Celsius to about 10 degrees Celsius, optionally at −20 degrees Celsius, −10 degrees Celsius, 0 degrees Celsius, or 10 degree Celsius. The intermixing and cool down may be repeated 1, 2, or 3 times to disperse the processing additive and fibrillizable binder combination in the active electrode material to form an electrode precursor material in a free flowing powder form. In some aspects, the intermixing and cool down may be repeated until the a tap density is measured from about 0.99 g/cm$^3$ to about 1.1 g/cm$^3$.

The electrode precursor material may be subsequently passed through a 355 micron sieve before calendered into a free-standing film. Once the electrode precursor material is formed, the electrode precursor material is fed into a roll mill and calendered to form a free-standing film. The free-standing film may be formed by calendering the free flowing electrode precursor material at a roll temperature and roll speed under a hydraulic pressure. The roll temperature may be from about room temperature (20 degrees Celsius) to about 180 degrees Celsius. A higher the roll temperature may result in a thinner free-standing film on the first pass compared to a lower temperature. Additionally, the roll speed may be set from about 0.17 meters per minute to about 1.3 meters per minute. A slower roll speed may result in a thinner free-standing film on the first pass compared to a faster roll speed. A hydraulic pressure of about 1,000 psi to about 7,000 psi may be used. A higher pressure may result in a thinner free-standing film on the first pass compared to a lower pressure. Additional passes through the roll mill may continue to reduce the film thickness until desired thickness and loading are obtained. In some aspects of the disclosure, an example, without limitation, film thickness may be about 50 µm to about 150 µm, optionally about 50 µm, to about 100 µm, optionally about 100 µm to about 150 µm, optionally about 50 µm, about 55 µm, about 65 µm, about 70 µm, about 75 µm, about 80 µm, about 85 µm, about 90 µm, about 95 µm, about 100 µm, about 105 µm, about 110 µm, about 115 µm, about 120 µm, about 125 µm, about 130 µm, about 135 µm, about 140 µm, about 145 µm, or about 150 µm. In some aspects of the disclosure, an example, without limitation, desired loading may be about 19 mg/cm$^2$ to about 21 mg/cm$^2$, optionally about 19 mg/cm$^2$, optionally about 20 mg/cm$^2$, or optionally about 21 mg/cm$^2$.

The free-standing film may be laminated on a substrate such as a metal foil current collector to form an electrode. Lamination may occur by rolling the free-standing film together with the metal foil current collector at a roll temperature and roll speed under a hydraulic pressure. The roll temperature is preferably about 100 degrees Celsius, but optionally 80 degrees Celsius or even 90 degrees Celsius. It is appreciated that the higher the roll temperature the greater the likelihood of blistering and poor adhesion. Similarly, the lower the roll temperature the worse the adhesion. Additionally, the roll speed may be from about 0.17 meters per minute to about 1.3 meters per minute, optionally about 0.5 meters per minute. Finally, the hydraulic pressure may be set from about 500 psi to about 2,000 psi. The pressure is set to promote adhesion to the substrate but not such that the chemical properties, for example loading and porosity, are altered. When the pressure is set too high the chemical properties are effected, but when the pressure is set too low adhesion may not occur.

The processes and electrode films produced thereby achieve a dry manufacture method that creates excellent electrochemical properties to resulting electrodes suitable for use in lithium ion or other cells.

Various aspects of the present disclosure are illustrated by the following non-limiting examples. The examples are for illustrative purposes and are not a limitation on any practice of the present disclosure. It will be understood that variations and modifications can be made without departing from the spirit and scope of the disclosure. Reagents and materials illustrated herein are obtained from commercial sources unless otherwise indicated.

EXPERIMENTAL

Example 1

Electrode active materials used as a cathode are formed using the following amounts of materials with percent being weight percent:

TABLE 1

| | Active Material | | Processing additive | Conductive Carbon | Binder |
|---|---|---|---|---|---|
| | LmFP | NCM | | | |
| POROCARB LG2N Fine Grade | 41% | 41% | 5% | 5% | 8% |
| Baseline Activated Carbon | 41% | 41% | 5% | 5% | 8% |

Electrodes are formed by mixing by the following procedure:
a. Combine Active Material, Processing additive and Conductive Carbon, Spin at 3,000 RPM for 1 min;
b. Repeat step a 2 more times with a 5 min cool down at −20° C. in between spins;
c. Add Binder to above mixture, blend at 18,000 RPM for 30 sec;
d. Repeat step c. 5 more times with a 10 min cool down at −20° C. in between blends; and
e. Pass blended material through 355 micron sieve.

Electrode films are formed by:
a. Pass sieved material produced by the above mixing procedure through a vertical roll mill to obtain initial free-standing alone film;
b. Pass free-standing film through a horizontal roll mill until desired thickness and loading are obtained; and
c. For lamination, place primed electrode substrate (e.g., Al foil) between two free-standing films and pass through a horizontal mill heated to 80° C.

Similar processes are used for the formation of anodes. Anodes are formed including 84% graphite, 4% AC or processing additive, 4% conductive carbon, 8% binder (PTFE or PTFE/PVDE/PE blend). Anodes are formed by processes similar to the cathode material, calendaring the powder mixture to form a stand-alone film at room temperature (porosity ~35%); laminating the film onto a Cu foil (porosity ~25%).

Figure 1:
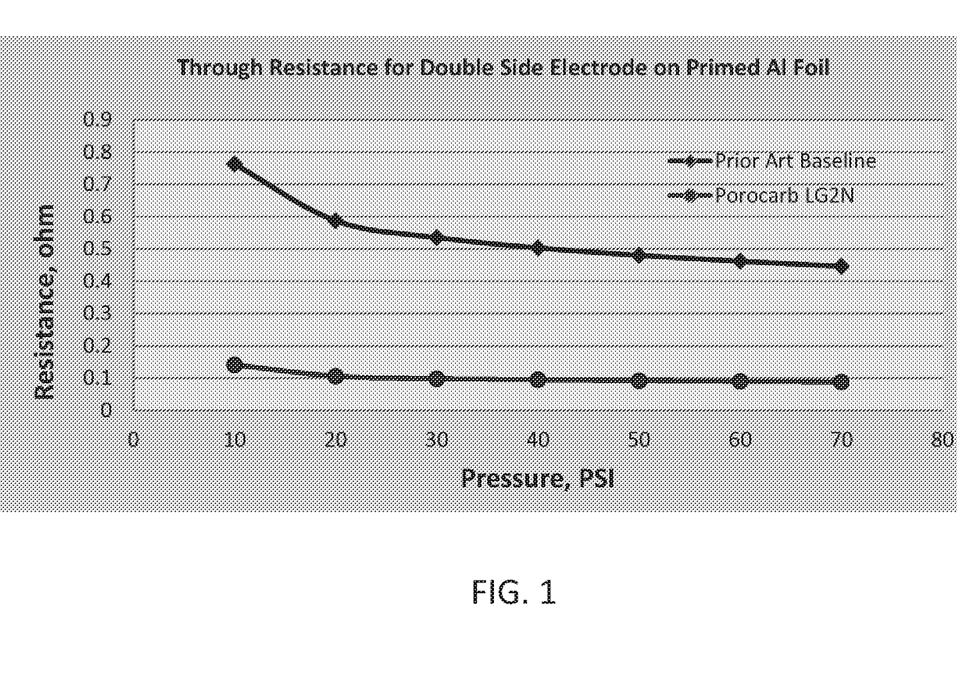
FIG. 1 is a graph of the results for through-plane resistance testing of electrodes formed with activated carbon and electrodes formed according to one or more aspects of the disclosure described herein.

In the formation of a cathode, the advantages of using a processing additive versus no additives are improved processibility and mechanical strength in electrodes formed in the absence of solvent or water. The advantages of using a processing additive as provided herein versus using AC are the possibility of using less additive, reduced residual moisture, easier drying, faster electrolyte wetting, and improved electrode uniformity following the milling operation. Using Karl-Fischer titration 16500 ppm of moisture was measured in the AC sample whereas only 2000 ppm of moisture was measured in the POROCARB processing additive sample using VAPOR Pro analysis. With the smaller particle size, a given mass fraction provides a higher numerical ratio of particles. The larger number and better dispersion result in improved electronic conductivity in the electrode, as shown in FIG. 1.

The advantages of using a processing additive in the formation of an anode include those noted for the cathode, as well as significantly improved reversibility (lower initial capacity loss due to SEI layer formation where studies showed that ICL is reduced from 37% (AC with 8% PTFE) to 32% (processing additive with 8% PTFE); and improved ease of processing to desired anode thickness in 50 µm range. Table 2 below presents the results discussed above.

TABLE 2

| | First Cycle Delithiation (mAh/g) | First Cycle Lithiation (mAh/g) | ICL |
|---|---|---|---|
| AC additive | 347 | 549 | 37% |
| POROCARB additive | 348 | 508 | 32% |

In addition, the large pore structure of the processing additive facilitates ion transport, which improves the electrical current density and rate retention for an electrode of given thickness and porosity, or enables electrodes to be processed to higher thickness or lower porosity for given capacity or rate retention.

Figure 2:
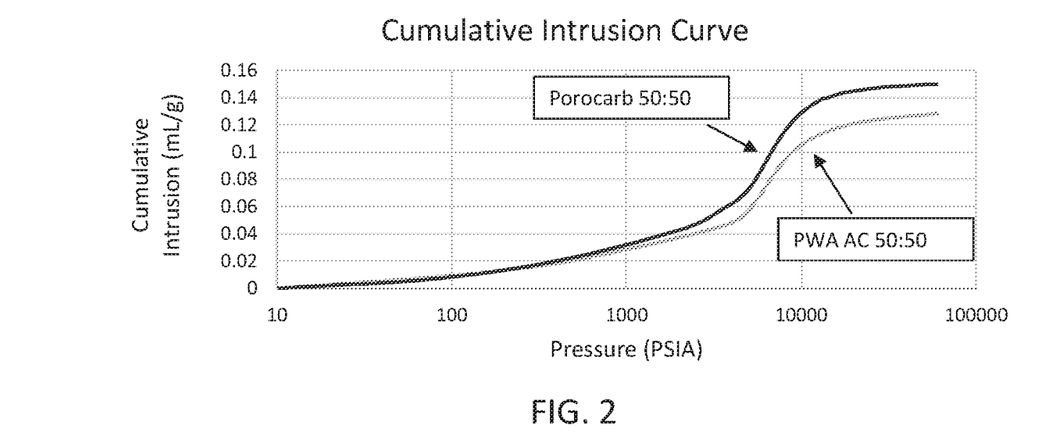
FIG. 2 is a graph comparing the cumulative intrusion at increasing pressures for electrode films comprising various processing additives according to one or more aspects of the disclosure described herein.
Figure 3:
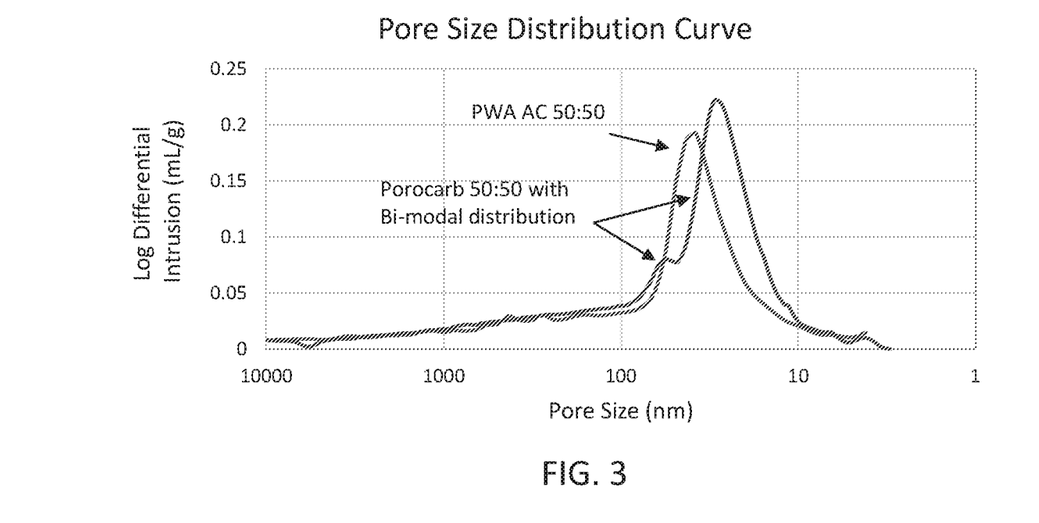
FIG. 3 is a graph of the distribution of pore size versus intrusion for an electrode film comprising a porous carbon processing additive POROCARB and an electrode film comprising activated carbon (AC) according to one or more aspects of the disclosure described herein.

The electrode materials show improved resistance properties when formed using a processing additive as provided herein. The electrodes as formed above are subjected to through-plane resistance testing with results demonstrated in FIG. 1. The results depicted in FIG. 1 indicate improved electrode uniformity and superior electrochemical performance relative to use of activated carbon. Referring to FIG. 2, a graph comparing the cumulative intrusion of the electrode film comprising POROCARB and the electrode film comprising activated carbon as described above across an increasing range of pressures is depicted. The POROCARB based electrode film achieves greater cumulative intrusion than the baseline activated carbon based electrode film. Referring to FIG. 3, the distribution of pore size to intrusion for the electrode film comprising POROCARB and the electrode film comprising activated carbon as described above is depicted. As shown, the POROCARB based electrode film has a bi-modal distribution with intrusion exceeding 0.2 mL/g.

Example 2

Several blends of active materials are investigated with a baseline formulation centering on a 50/50 mix. Free-standing films are obtained by processes of Example 1 using a range of active material blends comprising weight percents of active of 100% NMC, 80% NMC, 60% NMC, 50% NMC, 40% NMC, and 20% NMC. The active material blended with the NMC was LmFP as the remaining active.

A comparison of the baseline 50/50 blend) and a formulation using 100 wt % NMC is presented herein. Electrode active materials used as a cathode are formed using the following amounts of materials:

TABLE 2

|  | Baseline Formulation | 100% NCM Formulation |
|---|---|---|
| Formulation | 87% AM/3% CC/5% PA/ 5% Binder | 87% AM/3% CC/5% PA/ 5% Binder |
| AM 1 | 532 NMC from Light and Future (50% of AM) | 532 NMC from Light and Future (100% of AM) |
| AM 2 | LmFP from DOW (50% of AM) | N/A |
| CC | VGCF | VGCF |
| PA | POROCARB from Heraeus | POROCARB from Heraeus |
| Binder | PTFE from DuPont | PTFE from DuPont |

Active Material (AM), Conductive Carbon (CC), Processing Additive (PA), Vapor-Grown Carbon Fiber (VGCF)

The electrode films are formed by the process described in Example 1 above. The electrode films are then laminated on metal foil current collectors and half-cells are constructed. The electrochemical results from the half-cell formation are in Table 3:

|  | Baseline Formulation | 100% NCM Formulation |
|---|---|---|
| Assumed First Charge Capacity | 158 mAh/g | 175 mAh/g |
| Actual First Charge Capacity | 155 mAh/g | 171 mAh/g |
| % ICL | 10% | 10% |

Figure 4:
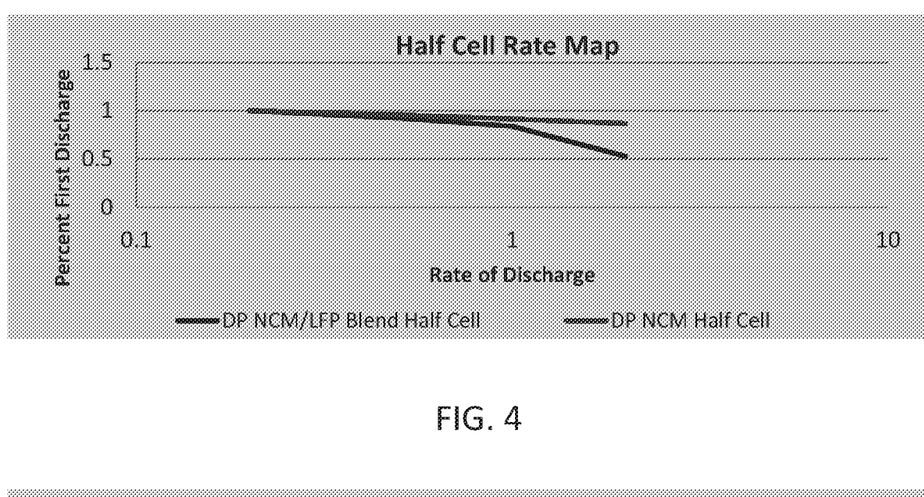
FIG. 4 is a graph of percent of first discharge at various rates of discharge for half-cells formed using NCM/LFP blend active (bottom line) or NCM active (top line) according to one or more aspects of the disclosure described herein.
Figure 5:
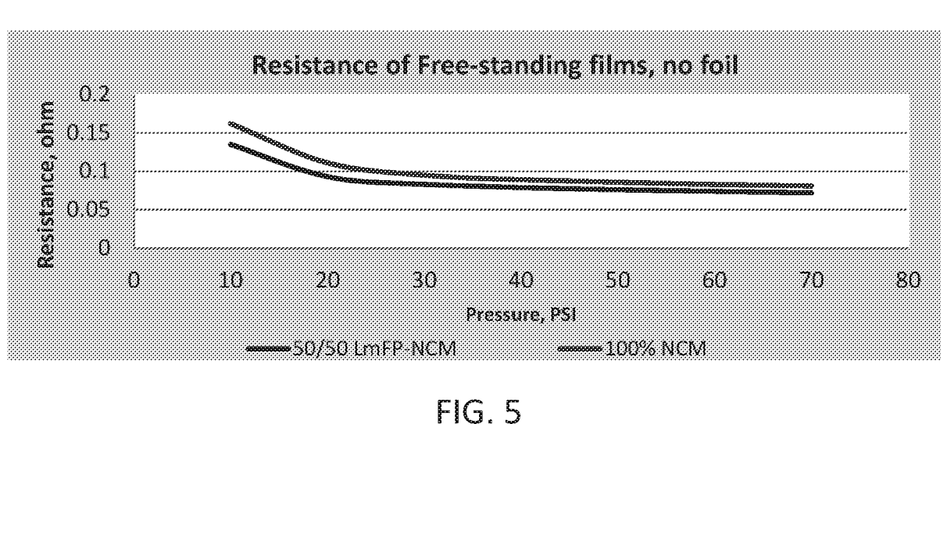
FIG. 5 is a graph of through-plane resistance assessed at increasing pressures for free-standing film formed using 50/50 LmFP-NCM active material (bottom line) or 100% NCM active material (top line) according to one or more aspects of the disclosure described herein.

Referring to FIG. 4, the percent of first discharge for half-cells at various rates of increasing discharge is shown. The half-cells formed by the dry process described herein with 100% NMC are generally consistent in percent of first discharge across the range of discharge rates as compared to the baseline half-cells. Referring to FIG. 5, the through-plane resistance of the free-standing film was assessed at increasing pressures. The resistance of the free-standing film comprising 100% NMC generally tracked the baseline free-standing film albeit with a slightly increased resistance. Additionally, mechanical properties of the free-standing film are investigated. The baseline formulation (50/50 mix) tested to a tensile strength of 1.98 N/mm$^2$, an elongation of 0.142 mm and percent elongation of 0.70%.

A few formulations comprising alternative processing additives such as Lithium Manganese Oxide (LMO) and hard carbon are also investigated in place of POROCARB and activated carbon. Although LMO is another active material, which could add some capacity to the formulation, it also provides some anchor sites during the fibrillization of the PTFE binder. A free-standing film is capable of being formed with the LMO, although could not be calendered to the desired thickness. Additionally, the hard carbon, specifically 9 µm hard carbon, did not produce a free-standing film indicating that the PTFE did not fibrillize to the extent required for film formation. The 9 µm hard carbon (e.g., LBV-1 Hard Carbon from Sumitomo Bakelite Co., LTD) comprised a specific surface area of 5 m$^2$/g, while for comparison, the initial activated carbon used had a surface area of 950 m$^2$/g and POROCARB was at 17 m$^2$/g. The use of POROCARB as the processing additive unexpectedly achieved better free-standing films than other processing additives such as hard carbon and LMO.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular aspects of the disclosure, but is not meant to be a limitation upon the practice thereof.

The invention claimed is:

1. A process for forming a free-standing electrochemically active film suitable for use in a cathode comprising:
    combining a carbon based processing additive with conductive carbon, and one of an active electrode material suitable for use in a cathode or polytetrafluoroethylene binder to form an electrode precursor material, wherein said processing additive is configured to fibrilize the binder, wherein said processing additive is not activated carbon, and wherein said processing additive comprises a surface roughness and a porosity;
    intermixing by blending said electrode precursor material;
    combining said electrode precursor material with the other of said polytetrafluoroethylene binder or said active electrode material;
    intermixing by blending said polytetrafluoroethylene binder or said active electrode material with said electrode precursor material to form an electrode film material wherein said electrode film material comprises said processing additive, said polytetrafluoroethylene binder and said active electrode material;
    wherein said processing additive and said binder are intermixed by high shear mixing such that said processing additive fibrillizes said binder sufficiently to form a free-standing electrode film, and wherein said intermixing is in the absence of a solvent at greater than weight 1%; and compressing said electrode film material into the free-standing electrode film suitable for use in a cathode.

2. The process of claim 1, wherein said processing additive and said active electrode material are combined and intermixed to form said electrode precursor material and said electrode precursor material and said polytetrafluoroethylene binder are combined and intermixed to form said electrode film material.

3. The process of claim 1, wherein said processing additive and said polytetrafluoroethylene binder are combined and intermixed to form said electrode precursor material and said electrode precursor material and said active electrode material are combined and intermixed to form said electrode film material.

4. The process of claim 1, wherein said electrode film material is absent activated carbon.

5. The process of claim 1, wherein said processing additive has an average diameter of 1 to 50 μm.

6. The process of claim 1, wherein said surface roughness of said processing additive comprises a high-porosity surface structure defined by a pore diameter of about 10 nanometers to about 1000 nanometers and a cumulative pore volume of about 0.8 to about 2.5 mL/g.

7. The process of claim 1, wherein said surface roughness of said processing additive comprises a high-porosity surface structure defined by a pore diameter of about 10 nanometers to about 1000 nanometers and a density of about 1500 to about 2500 $kg/m^3$.

8. The process of claim 1, wherein said electrode film comprises a thickness of 100 micrometers or less.

9. The process claim 8, wherein said active electrode material is capable of absorbing and desorbing lithium.

10. The process of claim 1, wherein said active electrode material comprises lithium iron phosphate.

11. The process of claim 1, wherein said processing additive comprises a graphitized particle.

12. The process of claim 1, wherein said processing additive is present at a concentration of 40 to 70 weight percent relative to said fibrillizable binder.

13. The process of claim 1, wherein said processing additive comprises a pyrolized material.

14. The process of claim 1, wherein said porosity of said processing additive is from about 35 vol % to about 40 vol %.

15. An electrochemical cell comprising an electrode comprising said electrode film of claim 1.

* * * * *